US006857707B2

(12) United States Patent
Guile

(10) Patent No.: US 6,857,707 B2
(45) Date of Patent: Feb. 22, 2005

(54) MULTIPLE DIRECTIONAL WHEEL

(76) Inventor: Graham Guile, Lot 21, Oakview Drive, Hallidays Point, NSW 2430 (AU)

(*) Notice: Subject to any disclaimer, the term of this patent is extended or adjusted under 35 U.S.C. 154(b) by 0 days.

(21) Appl. No.: 10/275,530

(22) PCT Filed: Sep. 20, 2001

(86) PCT No.: PCT/AU01/01175
§ 371 (c)(1), (2), (4) Date: Mar. 20, 2003

(87) PCT Pub. No.: WO02/24471
PCT Pub. Date: Mar. 28, 2002

(65) Prior Publication Data
US 2004/0004390 A1 Jan. 8, 2004

(30) Foreign Application Priority Data
Sep. 21, 2000 (AU) .............................................. PR0296

(51) Int. Cl.⁷ .............................................. B60B 19/00
(52) U.S. Cl. .......................................... 301/5.23; 16/45
(58) Field of Search ................................ 301/5.1, 5.23; 16/18 R, 45, 46, 47

(56) References Cited

U.S. PATENT DOCUMENTS

| 1,326,679 | A | * | 12/1919 | MacBeth et al. | 301/5.23 |
| 3,465,843 | A | | 9/1969 | Guinot | 180/79.3 |
| 3,882,885 | A | * | 5/1975 | McCain | 137/899.1 |
| 4,223,753 | A | | 9/1980 | Bradbury | 180/6.2 |
| 4,335,899 | A | * | 6/1982 | Hiscock | 280/259 |
| 4,926,952 | A | * | 5/1990 | Farnam | 180/6.5 |
| D309,254 | S | * | 7/1990 | Guile | D8/375 |
| D318,791 | S | | 8/1991 | Guile | D8/375 |
| 5,323,867 | A | | 6/1994 | Griffin et al. | 180/22 |
| 6,357,765 | B1 | * | 3/2002 | Heien | 280/5.26 |

FOREIGN PATENT DOCUMENTS

| DE | 3702660 | * | 8/1988 | |
| WO | WO 00/12327 | | 3/2000 | B60B/19/12 |
| WO | WO 02/46031 | | 6/2002 | B62D/61/00 |
| WO | WO 04/014667 | | 2/2004 | B60B/19/12 |

* cited by examiner

Primary Examiner—Russell D. Stormer
(74) Attorney, Agent, or Firm—Pedersen & Co., PLLC; Ken J. Pedersen; Barbara S. Pedersen

(57) ABSTRACT

A wheel (1) with an integrally formed wheel frame including a central hub (2) rotatable about a main axis, a plurality of first supports in a first plane transverse to the main axis and radially spaced from the central hub (2) to form a first discontinuous rim with a first series of rollers (4) regularly spaced around the first rim, a plurality of second supports radially spaced from the hub to form a second discontinuous rim with a second series of rollers (5) regularly spaced around the second rim, each rollers having a main body wherein the lateral central cross-sectional diameter is greater then the diameter of the end portions, each roller being rotatable about an axis transverse to the main axis and when viewed from a side elevation, there being substantial overlap of each of the first series of rollers (4) with each diagonally adjacent roller of the second series of rollers (5).

27 Claims, 6 Drawing Sheets

MULTIPLE DIRECTIONAL WHEEL

TECHNICAL FIELD

This invention relates to a wheel and, more particularly, a wheel adapted to travel in more than one direction.

BACKGROUND ART

Traditionally caster wheels have been used to provide wheeled support for a wide range of items for which mobility is desirable. Examples of such items include pianos, fridges, tea trolleys, supermarket trolleys and various other work-related or domestic items. The caster wheel comprises a single wheel rotatable about a generally horizontal axis, which horizontal axis is in turn mounted to a substantially vertical axis about which the hole unit pivots. The caster wheel generally acts as a follower, thereby enabling a wheel to travel in any direction in which it is pulled. Caster wheels are generally made of multiple components made of different materials and may require a costly and difficult manufacturing process. Moreover, the caster wheel is generally mounted on the object to be moved by its vertical axis making the attachment of the wheel to the object sometimes difficult to achieve.

More recently, another type of wheel capable of multiple directional travel has been considered and includes a central hub rotatable about a main axis and a plurality of independently mounted rotatable rollers located about the rim of the hub. The rollers are each capable of rotation about an axis transverse to the main axis whereby the wheel is capable of moving in a first direction in which the wheel rotates about the main axis or in a transverse direction in which one or more rollers contacting the ground rotate about their one or more axes.

However, the above described wheel is poorly adapted for transverse travel that there is virtually no overlap between diagonally adjacent rollers. The difficulty in placing the rollers closer together has proved a significant obstacle to the viability of such wheels. The combination of factors including the diameter, number and length of the rollers are important. The inner ends of the rollers cannot be so close as to interfere with one another, whereas the outer ends are spaced too far apart to provide a sufficiently continuous ground contacting surface. Moreover, this prior art wheel is difficult and time-consuming to manufacture due to the number of components involved and the time required for assembly.

The above description of the prior art is not intended to be, nor should it be interpreted as, an indication of the common general knowledge pertaining to the invention, but rather to assist the person skilled in the art in understanding the developmental process which lead to the invention.

It is proposed to provide a multiple directional wheel which ameliorates one or more of the disadvantages of the prior art or at least provides a useful alternative thereto.

DISCLOSURE OF INVENTION

Accordingly, in one aspect of the invention there is provided a wheel including:
(a) an integrally formed wheel frame including:
   (i) a central hub rotatable about a main axis;
   (ii) a plurality of first supports in a first plane transverse to the main axis and radially spaced from the central hub to form a first discontinuous rim; and
   (iii) a plurality of second supports radially spaced from the hub to form a second discontinuous rim, said second supports in a second plane transverse to the main axis and parallel to, and spaced from, the first discontinuous rim;
(b) a first series of rollers regularly spaced around the first rim and supported for rotation by the plurality of first supports; and
(c) a second series of rollers regularly spaced around the second rim and supported for rotation by the plurality of second supports,
wherein,
   (iv) each roller has a main body wherein the lateral cross-sectional diameter is greater than the diameter of the end portions of the main body;
   (v) each roller is rotatable about an axis transverse to the main axis; and
   (vi) when viewed in side elevation, each roller of the first series of rollers overlaps with each diagonally adjacent roller of the second series of rollers to the extent of between 20 and 35% of the length of each roller, whereby the wheel is capable of making efective ground contact through the main body of at least one of the rollers at any one time.

The wheel frame comprising the central hub and first and second supports may be formed in a number of ways. The central hub and first and second supports may be molded or machined using metal working techniques which are standard in the art. The wheel frame may be formed of a hybrid of metal and plastic components. These may be subsequently joined to form the wheel frame. For example, the central hub may be made out of a metal, such as cast iron, aluminium or stainless steel and the supports may be made from plastic. The central hub and first and second supports may be made from one or more plastic materials formed integrally or subsequently joined to form the frame.

Preferably, the wheel frame is integrally formed by injection molding using a suitable plastic material. Where plastic material is used to form the frame, this may include any one of a number of suitable plastics such as polypropylene or nylon 66, or a combination of different plastics and/or fillers or additives. Particularly preferred materials including 30% glass filled poly propylene and 20% glass filled nylon 66.

As is common in the art, the central hub defines a central cylindrical bore adapted to receive a main axle. The main axle may be made of metal, plastic or a plastic/metal composite provided the material has suitable strength and hardness properties.

The main axle is preferably simply mounted onto an object to be supported by the wheel by forming a bore in the side of the item or in an attachment attached to or supporting the item. The main axle bore will generally correspond to the diameter of the main axle, such that the main axle may be snugly inserted therein and optionally secured at its free end.

A spacer may be provided between the main axle bore and the central hub to avoid frictional contact between the rotating wheel and the object to be supported. Where the main axle extends through the central hub, rotating means may be used to secure the hub to the main axle. For example, a split pin may be used, either alone or in conjunction with a nut or the main axle may be peened over to hold the main axle in place.

Interposed between the main axle and the central hub there may be provided a bearing with dual races as is standard in the art to facilitate low frictional rotation of the wheel about the main axle. Alternatively, the contact between the main axle and the central hub may be low friction by virtue of the low-friction or self-lubricating materials selected therefor or by the use of suitable lubricants.

The end of the main axle secured to the object to be supported may be solid cylindrical, square, triangle or of any other suitable geometry and the main axle bore which receives it in the object or its attachment is preferably of a corresponding shape in transverse section whereby to prevent the rotation of the main axle relative to the main axle bore.

The first and second supports may be supported by any of a number of suitable structures adapted to extend from the central hub to the supports. For example, the supports may be supported by a disc in each of the first and second planes, the disc having cutaway portions whereby to receive the rollers. The first and second supports may alternatively be supported by spoke structures or rib structures in the form of arms extending angularly, spirally or radially from the hub to the first or second rim. The wheel frame may alternatively be formed from a solid disc-like block with roller recesses to receive the first and second series of rollers. Preferably, the first and second supports are supported by ribs extending radially from the hub to the first and second rims, respectively.

The first and second supports may include mounting means for mounting the rollers. The mounting means may comprise protrusions which extend into cavities defined by a central bore through each of the rollers. The mounting means may be adapted to form roller axles integrally formed with the frame whereby the rollers are formed around the integral axles during manufacture.

The roller mounting means may include axle recesses for receiving the ends of independent roller axles or the corner portions of a unitary polyaxled ring. In the case of independent roller axles, a separate axle is provided for each roller. In an alternative arrangement, there is provided a polyaxled ring. The polyaxled ring may have a polygonal configuration with linear sections for rotatably bearing rollers and corner portions connecting the linear sections. The corner portions may be used to mount the polyaxled ring onto the first and second supports. One polyaxled ring may be provided for each of the first and second supports.

The axle recesses may be round, triangular or square shaped in cross-section whereby to receive a corner portion or axle end of corresponding geometry. The corner portion or axle end may in each case be cylindrical and the corresponding axle recess may include a corresponding cylindrical shaped seat in which the corner portion or axle end is adapted to rest.

Preferably, each of the first and second supports includes a head in which is defined the axle recess for receiving the corner portion or axle end. The axle recess may include a shallow groove to receive the corner portion or axle end and may include a semi-circular saddle in which the corner portion or axle end is adapted to rest.

The head may present an outer surface which lies substantially flush with the end portions of the rollers. This may facilitate the protection of the roller mounting means from physical damage and may reduce the amount of dust and debris which would otherwise tend to collect in the mounting means.

The first and second supports are preferably narrow in profile to minimise the spacing between adjacent rollers in the first series and adjacent rollers in the second series. Preferably, the overlap between diagonally adjacent rollers in the opposed series corresponds to about 10 to 40% of the length of the rollers, more particularly 20 to 35%, and most preferably about two sevenths (28%) to a third (33%) of their length.

The axle end may be received within the axle recess in a tight friction fit whereby the roller axle is not rotatable relative to the frame. Of course, a polyaxled ring having multiple axes will have no tendency to rotate. However, for the purposes of structural rigidity it is still desirable to securely mount the corner portions in the axle recesses.

Accordingly, each axle recess may include securement means at its mouth which is adapted to prevent inadvertent dislodgment of the roller axle from the axle recess. The securement means may be in the form of a number of different structures capable of preventing the corner portion or axle end from dislodging. The securement means may include a biased protrusion in the internal wall of the axle recess which, on depression, allows entry of the corner portion or axle end into the axle recess.

The securement means may include one or more flaps which may be folded down after the corner portion or axle end has been inserted into the axle recess. The securement means may include a pair of opposed plastic flaps which can be folded down and heat fused together to secure the corner portion or axle end in the axle recess. The person skilled in the art will appreciate that in fusing the pair of flaps, the corner portion or axle end may not be fused to the flaps, but may merely rest in the axle recess in a tight friction fit. Each roller axle may be oriented along an axis transverse to the axis of the main axle.

The mouth of the axle recess through which the corner portion or axle end is received may be oriented radially outwardly from the central hub. The axle recess mouth may be oriented in a direction parallel to the axis of the central hub.

The rollers may be formed independently of the wheel frame and later mounted thereto. The main body and end portions of the roller may be separately or integrally formed. The rollers may include bearings at either end to rotatably cooperate with the mounting means without the need for a roller axle extending through its axis. Alternatively, each roller may have an axle, either formed integrally with the wheel frame or separately formed. In any case, each roller is preferably adapted to independently rotate about an axis transverse to the main axle axis.

The rollers may be identical to one another or may vary dimensionally and in terms of their shape and the materials from which they are made. The rollers of the first series may be different dimensionally compared to the second series of rollers. Alternate rollers in the same series may be large and small, longer and shorter, proud and low profile. Preferably, the rollers of the first and second series are identical to minimise production costs.

The number of rollers may vary provided that it is possible to achieve sufficient overlap between diagonally adjacent rollers. The number of rollers in each series may be as low as five and as high as twelve. Preferably, the number of rollers in each series is six to eight.

Preferably, each roller is formed in a manufacturing process separate from the manufacture of the wheel frame and is subsequently attached thereto. Each roller may include a central bore through which a roller axle is adapted to extend. The section of the roller axle extending through the roller may be adapted to support bearings interposed between the axle and the roller. The roller axle may be made of any of a number of suitable materials such as a range of metals, including alloys, and plastics having suitable strength and hardness, and optionally self-lubricating, properties. Preferably, the roller axle is formed from a very hard plastic material such as polycarbonate or acetal or other formaldehyde-based plastics possessing similar properties of strength, rigidity and hardness. The roller axle may be formed by injection molding.

The roller may include multiple components. The roller may include an inner core made of a rigid and strong material such as acetal. The inner core may comprise a bush. The inner core may itself be made of multiple components. The inner core may be made from a pair of halves. The pair of halves may be formed separately and thereafter combined to form the inner core. The inner core may define an axial bore through which the roller axle is adapted to extend. Each one of the pair of halves may be identical to save on production and logistics costs. The halves may have complementary engagement means such as protrusions, apertures, clamps, ridges or grooves. The engagement means may effect an interference fit or rely on positive engagement.

The roller may include a tire adapted to surround the inner core. The inner core may include surface features to facilitate bonding of the tire to the inner core's outer surface. Such features may include longitudinal or lateral ribs. Such features may serve the dual purpose of providing the inner core with improved structural rigidity. The tire may be molded to the inner core in a separate process.

Consequently, the roller may be formed from a range of suitable materials, including rubber, thermoplastic materials, nylon and polyurethane. Polyurethane material with a Shore hardness rating in the range of 80A and 83A is particularly preferred for the tire component.

In manufacture, in one embodiment corresponding to the use of a separately formed axle for each roller, the rollers may be applied to the wheel frame, itself formed by injection moulding in one integral piece, to complete the wheel. This aspect of the wheel manufacture may be entirely automated whereby to simultaneously mount multiple rollers onto the frame. For example, all rollers belonging to the first or second series may be applied in unison.

In another embodiment involving the use of the polyaxled ring, the manufacture of the wheel may include the following steps:

a) Molding or casting a pair of polyaxled rings;
b) Assembling an inner core of a roller about a corresponding axle portion of the polyaxled ring;
c) Molding a tire about each inner core to form finished rings with rollers;
d) Pressing each of the finished rings into a wheel frame by engaging corner portions of the each ring with corresponding supports of the wheel frame;
e) Heat sealing the corner portions in the supports.

BRIEF DESCRIPTION OF DRAWINGS

The invention may be better understood from the following non-limiting description of a preferred form of the invention and the drawings in which:

In FIG. 1 there is shown a wheel 1 comprising a central hub 2 and radially extending ribs 3 depending from the central hub 2 to form a wheel frame, and a first series of rollers 4 and a second series of rollers 5.

Figure 1:
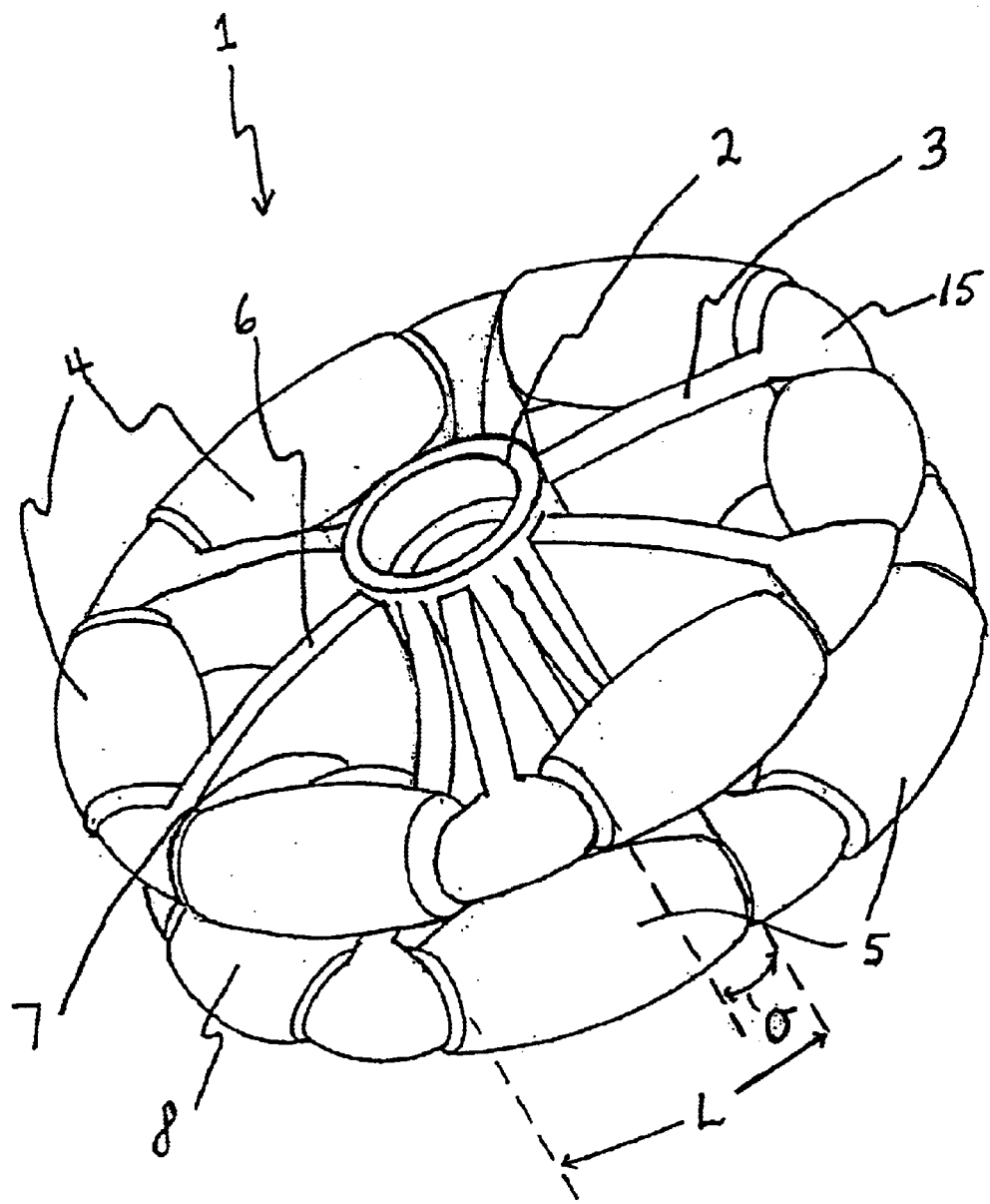
FIG. 1 is a perspective view of the wheel according to one embodiment.

The central hub 2 defines a cylindrical core through which a main axle (not shown) may be inserted. The radial ribs 3 include a shallow outwardly curving edge 6 and a deep arched edge 7 adapted to provide clearance for an adjacent roller. Each rib 3 supports either end of a pair of rollers of one of the first or second series of rollers 4, 5 and the arched edge 7 provides clearance for a roller 4, 5 of the roller series not supported by the rib 3. For example, in FIG. 1 the rib referenced by numerals 6, 7 supports a pair of rollers 4 of the first series of rollers and its arched edge 7 provides clearance for a particular roller 8 belonging to the second series of rollers 5.

Figure 2:
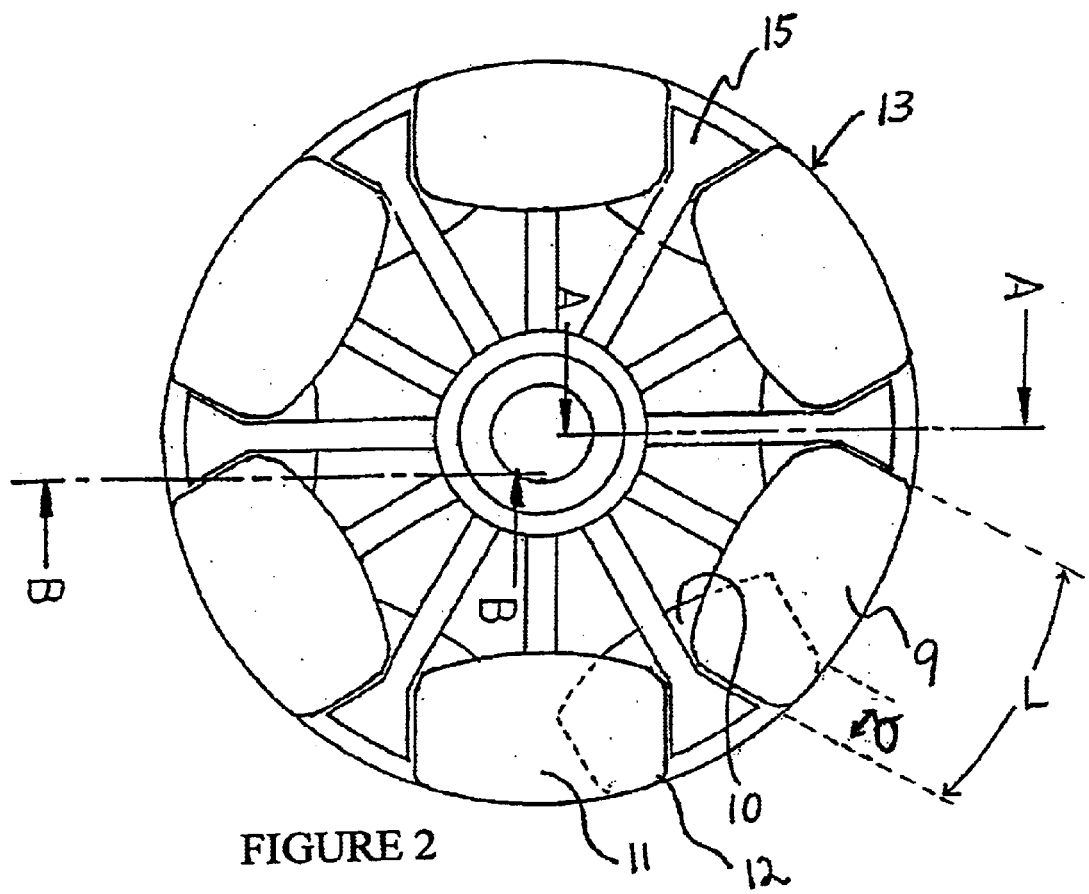
FIG. 2 is a side elevation of the embodiment shown in FIG. 1.

With reference to FIG. 2, each roller 4, 5 in side elevation is of a bi-truncated elliptical shape having a main body 11 having a larger diameter than each of the end portions 12. Considerable overlap is provided between diagonally adjacent rollers 9, 10 when viewed from a side elevation. This is particularly important as the utility of the invention depends on good ground contact being made by the main body 11 of at least one roller of the wheel 1 rather than an end portion 12 alone of the roller. See overlap O of ground-engaging surfaces of diagonally adjacent rollers relative to roller length L shown schematically in FIGS. 1, 2, and 9. See overlap O of ground-engaging surfaces of diagonally adjacent rollers relative to roller length L shown schematically in FIGS. 1, 2, and 9.

It can be seen that the first and second series of rollers 4, 5 in combination present a rim 13 having a substantially continuous circular profile. The circular rim profile 13 enables the wheel 1 to display a smooth rotation over the ground travelling in a direction transverse to the main axis and relatively smooth travel in directions parallel to the main axis. Moreover, the combined effect of the circular rim profile 13 together with the large diameter of the main body 11 and the substantial overlap between diagonally adjacent rollers 9, 10 provides the wheel 1 with relatively smooth travel in directions parallel to the main axis.

Figure 3:
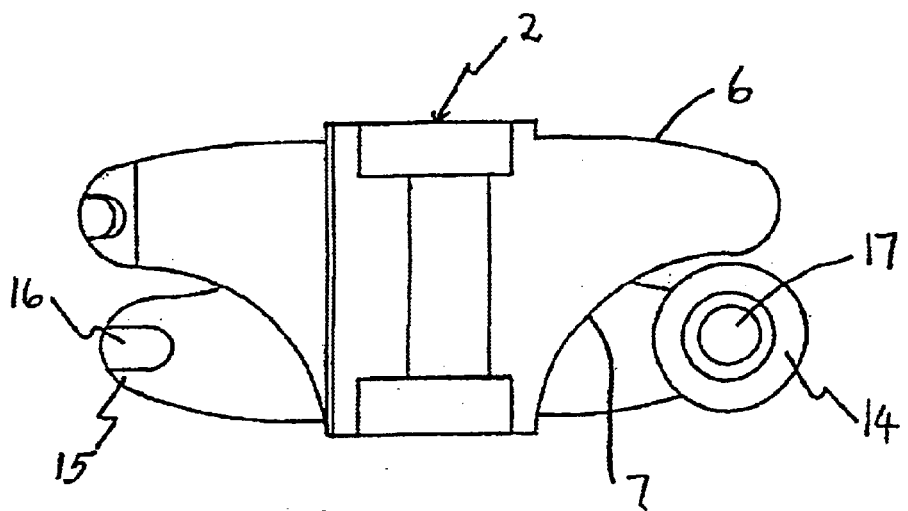
FIG. 3 represents transverse sections A—A and B—B shown in FIG. 2.

With reference to FIG. 3, the wheel is shown in transverse section with only one roller 14 displayed in order to make other features more clear. Each rib 3 terminates at its outer end with a head 15 having a frustoconical shape when viewed from a side elevation (see FIG. 2). Each head includes slots 16 adapted to non-rotatably receive in snug friction-fit a roller axle 17 of circular cross-section. Each head 15 may include a pair of slots or a single slot extending through the head 15.

Figure 4:
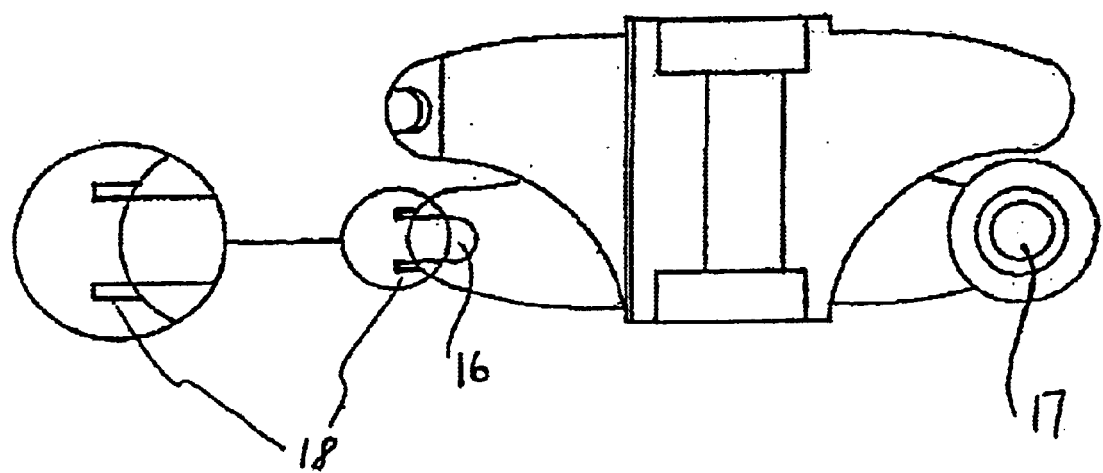
FIG. 4 is a sectional view of a second embodiment.

During manufacture, the frame is formed in one integral piece by injection molding. The roller axles are all formed in a separate process by injection molding. In an automated process, the rollers 4, 5 are applied to the wheel 1, six rollers 4, 5 at a time in a two stage process whereby to complete the wheel 1. That is, the first series of rollers 4 is applied in a single automated process to the frame in a first stage and the second series of rollers 5 is applied to the frame in a second stage. Each of the roller axles 17 may then be secured within respective slots 16 by the heat fusion of a pair of opposed plastic flaps 18 shown in FIG. 4. The roller axle 17 is not heat fused to the flaps 18. The flaps 18 are heat sealed whereby to prevent the inadvertent dislodgment of the roller axle 17 from the slot 16.

In use, a main axle may simply be mounted to the side of an object to be movably supported, the wheel 1 rotatably mounted on the main axle and secured by a split pin or the like. By mounting three or more such wheels 1, the object may be moved in directions parallel and transverse to the main axle.

Figure 5:
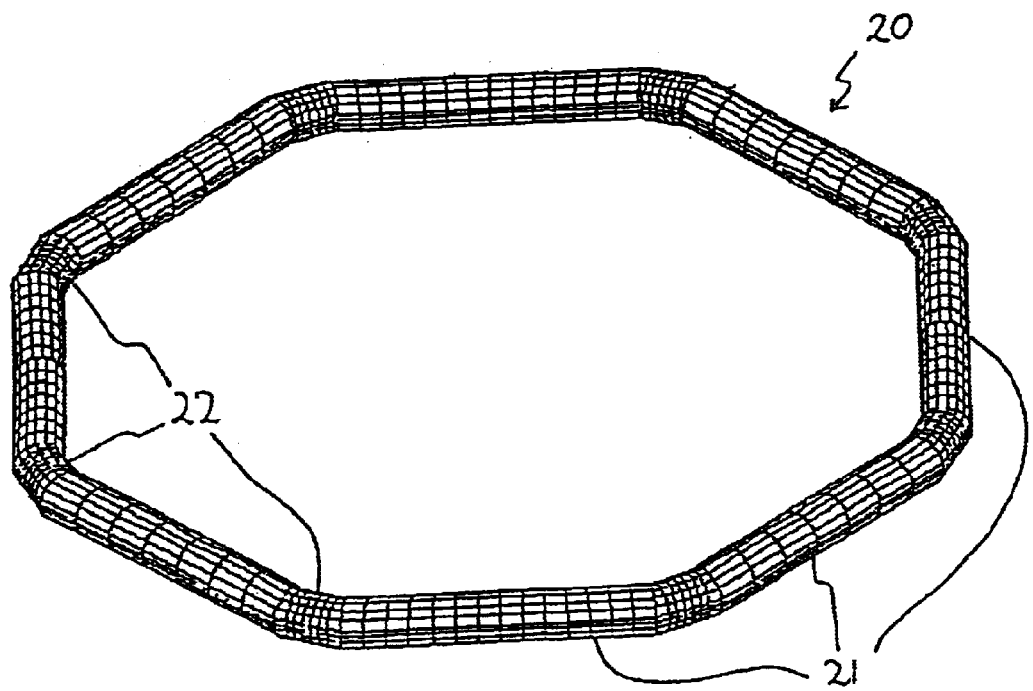
FIG. 5 is a perspective view of a polyaxled ring of a third embodiment.

In FIG. 5, there is shown a polyaxled ring 20 having a predominantly hexagonal shape and comprising 8 linear sections 21 joined by corner portions 22. The polyaxled ring 20 is solid cylindrical in cross-section. The polyaxled ring 20 is made from acetal for strength and rigidity. The polyaxled ring 20 is integrally formed by injection molding.

Figure 6:
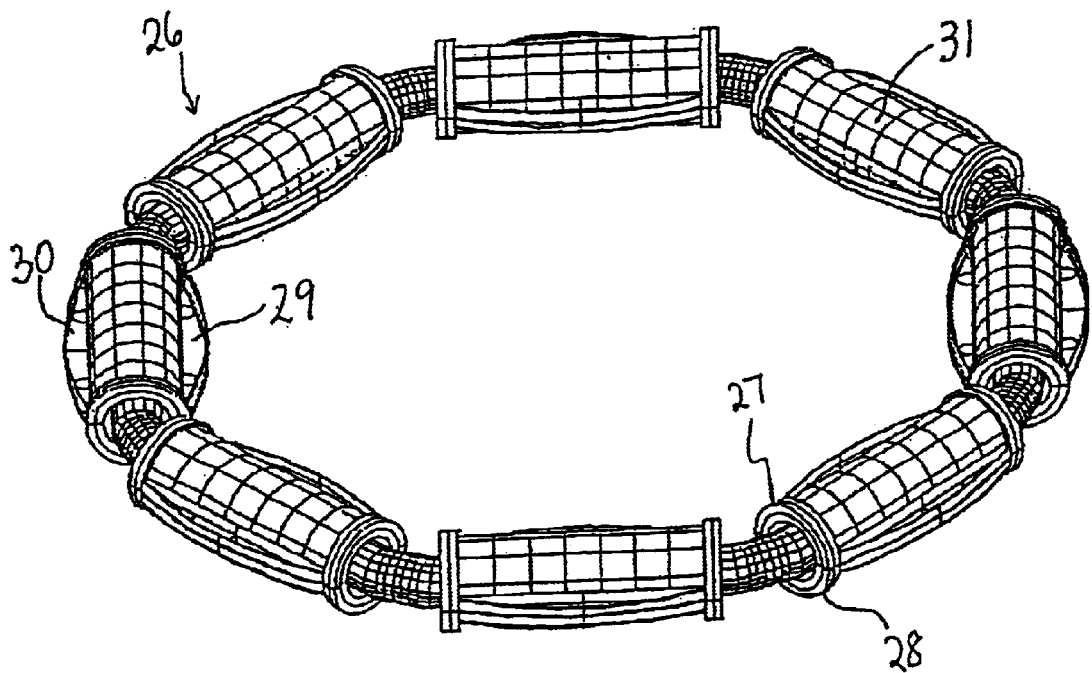
FIG. 6 is a perspective view of a polyaxled ring of the third embodiment bearing roller bushes.
Figure 7:
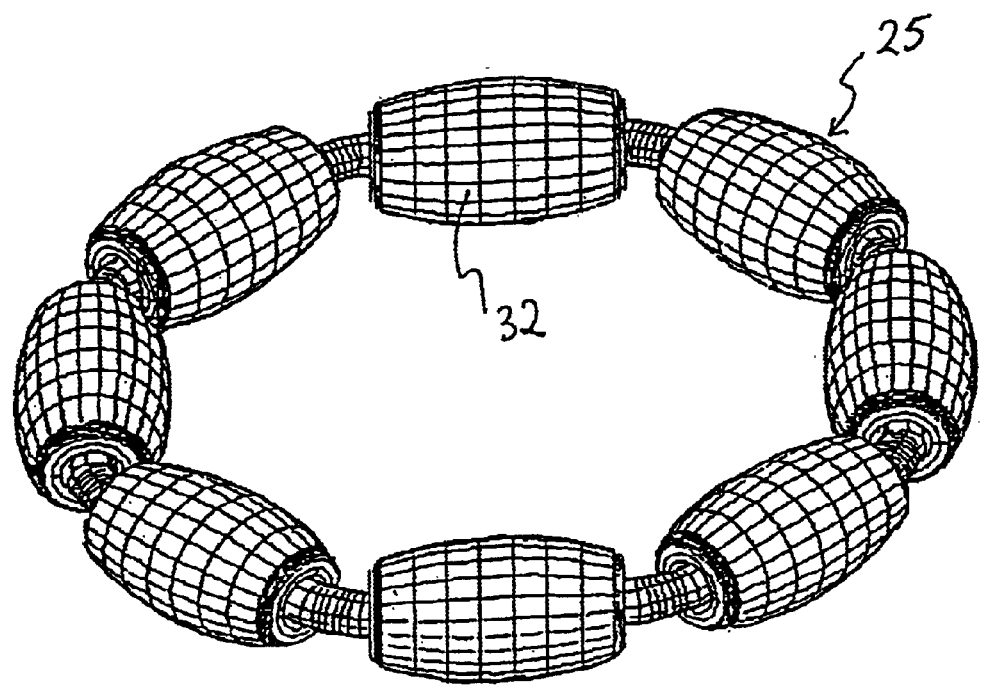
FIG. 7 is a perspective view of a polyaxled ring of the third embodiment bearing finished rollers.

Rollers 25 shown in FIG. 7 are formed in a two stage process whereby an inner core in the form of a bush 26 shown in FIG. 6 is formed by clamping two identical half segments 27 and 28 are clamped together by snap-on engagement. Each half segment 27, 28 includes a pair of opposed flanges 29 and 30. Male flange 29 includes downwardly depending protrusions adapted to engage with apertures set in the underside of female flange 30. Accordingly, a single dye may be used to manufacture the bushes 26. The bushes 26 may include lateral or longitudinal ribs extending radially or outwardly from the bush surface 31 to ensure good interference with the tyre material to be moulded thereon. The bush 26 is made from nylon 66 which material has good wear resistance, strength and rigidity properties.

The polyaxled ring 20 bearing the assembled bushes 26 is inserted in an injection molding machine having dye cavities defining the shape of the tire component 32 of the roller 25. Polyurethane material having good tacky (gripping) and low noise properties together with relatively good wear resistance properties is injected into the dye cavities to form the tire components 32 around the bushes 26. The ribs referred to in relation to FIG. 6 assist in ensuring that the tire component 32 does not peel off the bush after extended wear. The rollers 25 are barrel shaped, having a larger central diameter than the diameter of the end portions thereof.

Figure 8:
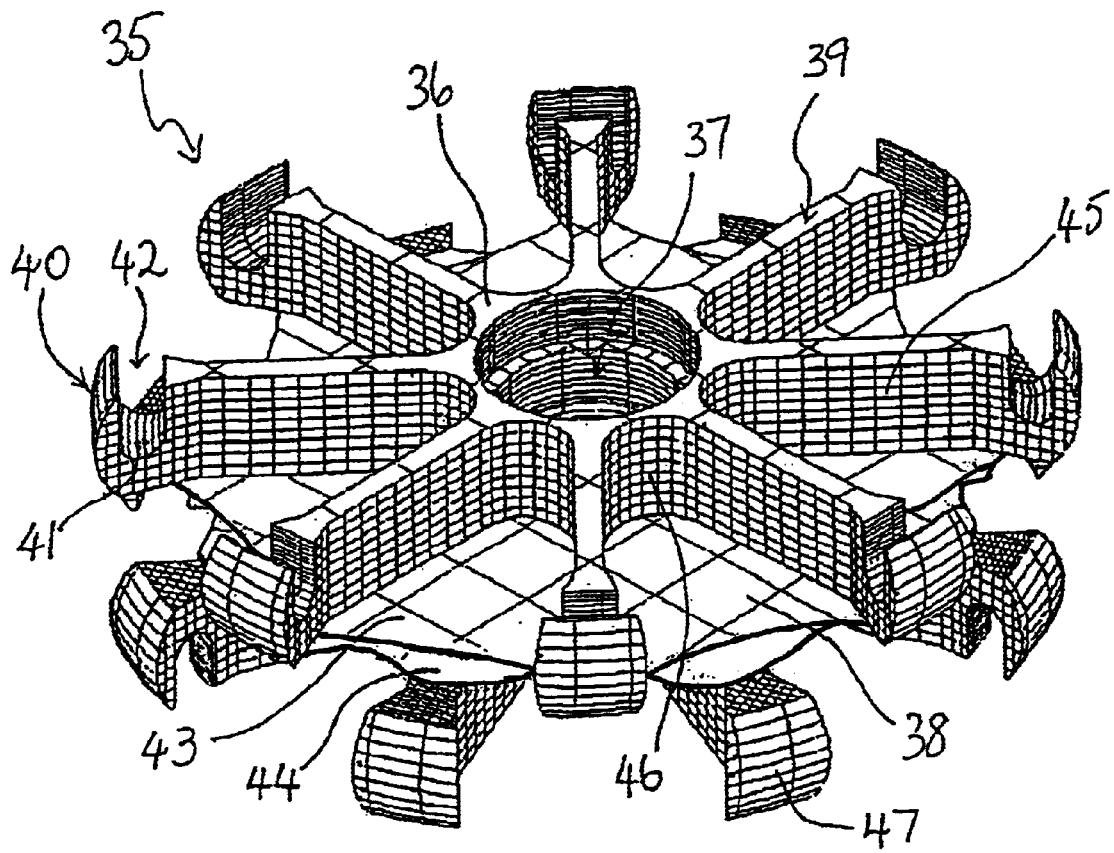
FIG. 8 is a perspective view of a wheel frame of the third embodiment.

In FIG. 8 there is shown a wheel frame 35 which may be integrally formed or made may be assembled from separately formed components. As shown in FIG. 8, the wheel frame 35 may comprise two identical first and second halves 43, 44 respectively bearing the first and second supports according to the invention. The first and second halves 43, 44 may be lockably engageable by snap-fit, non-releasable couplings configured to ensure the first and second halves 43, 44 assume the required staggered configuration of the completed wheel frame 35.

The wheel frame 35 includes a central hub 36 defining a central bore 37. The wheel frame 35 includes a central disk 38 on which is mounted on either side eight arms 39 extending radially outwardly from the central hub 36 and terminating in first and second supports in the form of heads 40 extending just beyond the central disk 38.

The arms 39 integrally molded with the disc 38 each include a narrow, high-walled central shaft 45 joined to the central hub 36 by curved wall sections forming bridge portions 46. The curved wall configuration of the bridge portions 46 spreads the load borne by the central hub 36 and reduces the stress concentrations which would otherwise be applied to the bridge portions 46. The load is transferred from the roller 32 through the polyaxled ring 20 to the head 40, through the shaft 45 to the bridge 46 and then to the main axle.

The head 40 includes a seat 41 having a mouth facing outwardly in a direction parallel to the axis of the central bore 37 and defining an axial recess 42 adapted to receive the corner portions 22 of the polyaxled ring 20. The heads 40 each diverge from the shaft 45 to substantially fill the gap between adjacent rollers 32 in the same series. The head 40 presents an outer surface 47 which lies substantially flush with the end portions of the rollers. This may facilitate the protection of the roller mounting means from physical damage and may reduce the amount of dust and debris which would otherwise tend to collect in the mounting means.

Figure 9:
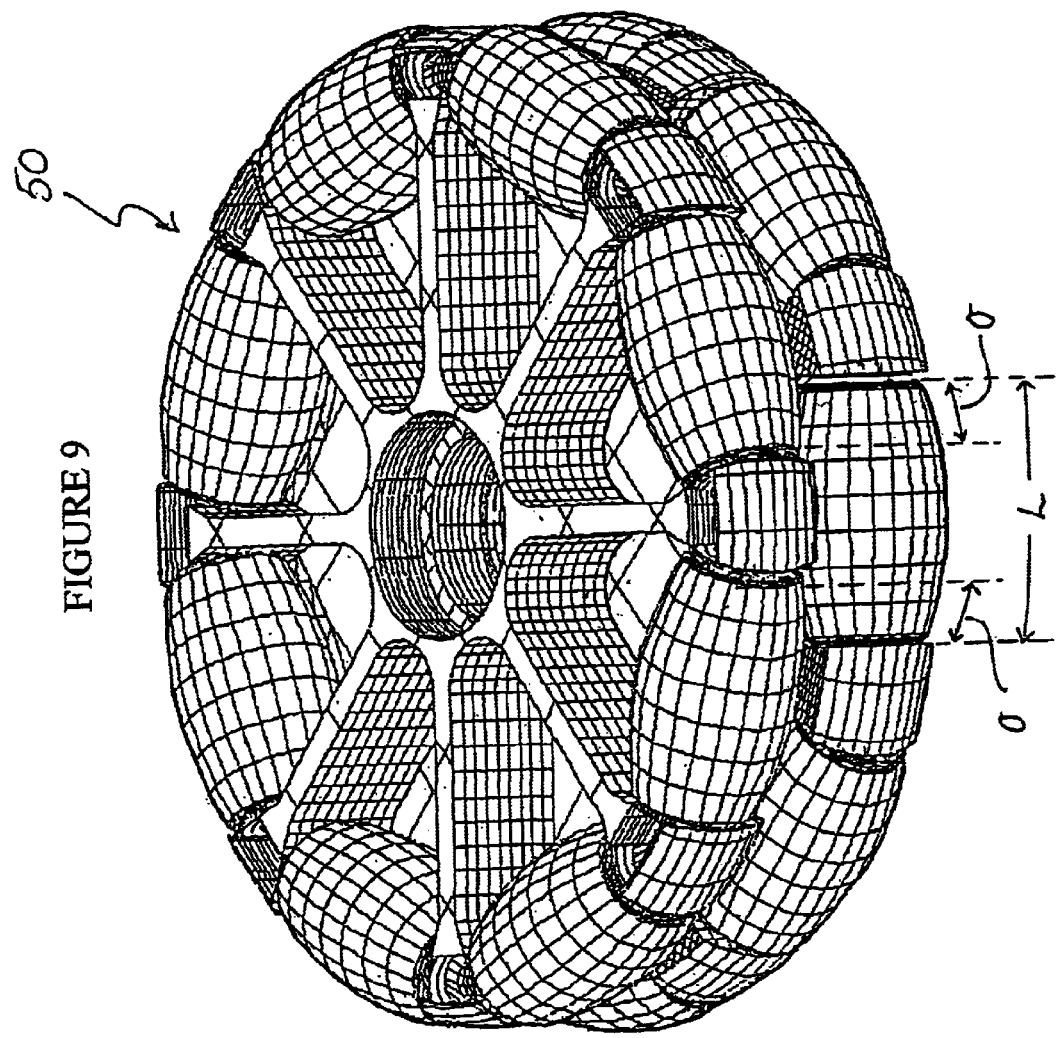
FIG. 9 is a perspective view a completed wheel of the third embodiment.

As shown in FIG. 9, the completed wheel may be assembled by pressing the corner portions 22 into the corresponding axle recesses 42 on either side of the wheel frame 35. The corner portions 22 are then heat sealed in the recesses 42 to complete a stable structure.

In use, the wheel 50 is mounted to a main axle (not shown) extending wholly or partly through central bore 37 such that wheel 50 is capable of rotating about the axis of central bore 37. The article to which the wheel 50 is to be mounted, such as a supermarket trolley (not shown), either has a pre-existing bore to receive the main axle or a receiving bore is formed therein. The main axle is fixedly mounted in the receiving bore in the supermarket trolley such that the lowermost portions of the wheel 50 extend downwardly beyond the lowermost portion of the supermarket trolley. Typically, four such wheels 50 are so mounted to the supermarket trolley. In practice, the combination of the rotation of the wheel 50 about the main axle and the rotation of the rollers 25 contacting the ground enable the supermarket trolley to travel in any direction, whether straight ahead in which only rotation of the wheel 50 about the main axis is involved, transverse movement involving only the rotation of one or more rollers 25 or a combination of rotation of the wheel 50 about the main axle and rotation of one or more rollers 25 to enable diagonal travel.

Throughout the specification and claims the word "comprise" and its derivatives are intended to have an inclusive rather than exclusive meaning unless the context requires otherwise.

It will be appreciated by those skilled in the art that many modifications and variations may be made to the embodiments described herein without departing from the spirit or scope of the invention.

What is claimed is:

1. A wheel including:
   (a) an integrally formed wheel frame including:
      (i) a central hub rotatable about a main axis;
      (ii) a plurality of first supports in a first plane transverse to the main axis and radially spaced from the central hub to form a first discontinuous rim; and
      (iii) a plurality of second supports radially spaced from the hub to form a second discontinuous rim, said second supports in a second plane transverse to the main axis and parallel to, and spaced from, the first discontinuous rim;
   (b) a first series of rollers regularly spaced around the first rim and supported for rotation by the plurality of first supports; and
   (c) a second series of rollers regularly spaced around the second rim and supported for rotation by the plurality of second supports,
   wherein,
      (iv) each roller has a main body wherein the lateral cross-sectional diameter is greater than the diameter of the end portions of the main body;
      (v) each roller is rotatable about an axis transverse to the main axis; and
      (vi) when viewed in side elevation, the effective ground contacting surface of each roller of the first series of rollers overlaps with the effective ground contacting surface of each diagonally adjacent roller of the second series of rollers to the extent of between 20 and 35% of the length of each roller, so that the wheel is adapted to make effective ground contact through the main body of at least one of the rollers at any one time for improved travel parallel to said main axle.

2. A wheel according to claim 1, wherein a plurality of radial arms extend from the central hub to the plurality of first and second supports whereby to radially space the supports from the central hub.

3. A wheel according to claim 2, wherein the each one of the plurality of first and second supports is spaced from the central hub by a corresponding one of the radial arms.

4. A wheel according to claim 1 herein at least the first series of rollers is mounted for rotation on a first polyaxled ring.

5. A wheel according to claim 4, wherein the second series of rollers is mounted for rotation on a second polyaxled ring.

6. A wheel according to claim 5, wherein each roller is mounted on one of a plurality of corresponding axle portions of the first and second polyaxled rings.

7. A wheel according to claim 1, wherein the roller includes an inner core and a tire applied to the core.

8. A wheel according to claim 7, wherein the inner core comprises a pair of separately formed halves.

9. A wheel according to claim 7, wherein the inner core comprises a pair of identical halves complementarily engageable to one another.

10. A wheel according to claim 9, wherein the identical halves together define an axial bore adapted to receive an axle portion.

11. A wheel according to claim 7, wherein the inner core includes surface features to facilitate adherence of the tire to the inner core.

12. A wheel according to claim 1, wherein each of the first and second supports includes a head having an outer surface which lies substantially flush with the end portions of adjacent rollers in the first series or the second series of rollers.

13. A wheel according to claim 12, wherein the head outer surface substantially covers the gap between adjacent rollers in the first series or the second series of rollers whereby to reduce debris and dust which may otherwise enter the first or second supports.

14. A wheel according to claim 1, wherein the number of rollers in the first series or the second series of rollers is between 6 and 8.

15. A wheel according to claim 1, wherein the overlap of each of the first series of rollers with each diagonally adjacent roller of the second series of rollers is 28% to 33% of the length of each of the rollers.

16. A wheel according to claim 1, wherein each of said rollers is generally cylindrical.

17. A wheel including:
(a) an integrally formed wheel frame including:
 (i) a central hub rotatable about a main axis;
 (ii) a plurality of first supports in a first plane transverse to the main axis and radially spaced from the central hub to form a first discontinuous rim; and
 (iii) a plurality of second supports radially spaced from the hub to form a second discontinuous rim, said second supports in a second plane transverse to the main axis and parallel to, and spaced from, the first discontinuous rim;
(b) a first series of rollers regularly spaced around the first rim and supported for rotation by the plurality of first supports; and
(c) a second series of rollers regularly spaced around the second rim and supported for rotation by the plurality of second supports,
wherein,
 (iv) each roller has a main body wherein the lateral cross-sectional diameter is greater than the diameter of the end portions of the main body;
 (v) each roller is rotatable about an axis transverse to the main axis; and
 (vi) when viewed in side elevation, each roller of the first series of rollers overlaps with each diagonally adjacent roller of the second series of rollers to the extent of between 20 and 35% of the length of each roller, whereby the wheel is capable of making effective ground contact through the main body of at least one of the rollers at any one time;
wherein at least the first series of rollers is mounted for rotation on a first polyaxled ring that comprises a plurality of axle portions and an equal plurality of corner portions, each axle portion intermediate two of the corner portions, and each roller of the first series of rollers is mounted for rotation on one of the axle portions of the first polyaxled ring.

18. A wheel according to claim 17, wherein the second series of rollers is mounted for rotation on a second polyaxled ring that comprises a plurality of axle portions and an equal plurality of corner portions, each axle portion intermediate two of the corner portions, and each roller of the second series of rollers is mounted for rotation on one of the axle portions of the second polyaxled ring.

19. A wheel according to claim 18, wherein each of said first supports and said second supports has a distal end comprising a generally semi-circular head adapted to receive a corner portion of said first polyaxled ring and said second polyaxled ring, respectively.

20. A wheel according to claim 18, wherein said first polyaxled ring and said second polyaxled ring are each a hexagonal ring having six linear portions that are said axle portions and having six of said corner portions between the linear portions.

21. A wheel according to claim 18, wherein said first polyaxled ring and said second polyaxled ring are each an octagonal ring having eight linear portions that are said axle portions and having eight of said corner portions between the linear portions.

22. A wheel according to claim 17, wherein each of said rollers is generally cylindrical.

23. A method of manufacturing a multiple directional wheel comprising:
a) providing a wheel frame comprising:
 (i) a central hub rotatable about a main axis;
 (ii) a plurality of first supports in a first plane transverse to the main axis and radially spaced from the central hub to form a first discontinuous rim; and
 (iii) a plurality of second supports radially spaced from the hub to form a second discontinuous rim, said second supports in a second plane transverse to the main axis and parallel to, and spaced from, the first discontinuous rim;
b) molding or casting a first and a second polyaxled ring;
c) assembling an inner core of each of a first series of rollers about a corresponding axle portion of the first polyaxled ring and assembling an inner core of each of a second series of rollers about a corresponding axle portion of the second polyaxled ring,
d) molding a tire about each inner core to form finished first and second polyaxled rings with rollers, each roller having a main body wherein the lateral cross-sectional diameter is greater than the diameter of the end portions of the main body;

e) pressing each of the finished first and second polyaxled rings into the wheel frame by engaging corner portions of the first and second polyaxled rings with the corresponding first and second supports of the wheel frame; and f) heat sealing the corner portions in the supports.

24. A wheel according to claim 23, wherein each of said rollers is generally cylindrical.

25. A method according to claim 23, wherein said first supports and said second supports each have a distal end with a generally semi-circular head, and wherein said pressing comprises pressing the first and second polyaxled rings into the generally semi-circular heads of the first supports and second supports, respectively.

26. A wheel according to claim 23, wherein said first polyaxled ring and said second polyaxled ring are each a hexagonal ring having six linear portions that are said axle portions and having six of said corner portions between the linear portions.

27. A wheel according to claim 23, wherein said first polyaxled ring and said second polyaxled ring are each an octagonal ring having eight linear portions that are said axle portions and having eight of said corner portions between the linear portions.

* * * * *